(12) United States Patent
Chung et al.

(10) Patent No.: US 9,996,123 B1
(45) Date of Patent: Jun. 12, 2018

(54) COMPUTER DEVICE

(71) Applicant: AIC INC., Taoyuan (TW)

(72) Inventors: Tzu-Yen Chung, Taoyuan (TW); Hsin-Chan Liu, Taoyuan (TW); Ta-Chih Chung, Taoyuan (TW)

(73) Assignee: AIC INC., Taoyuan (TW)

( * ) Notice: Subject to any disclaimer, the term of this patent is extended or adjusted under 35 U.S.C. 154(b) by 0 days. days.

(21) Appl. No.: 15/674,190

(22) Filed: Aug. 10, 2017

(51) Int. Cl.
*G06F 1/18* (2006.01)

(52) U.S. Cl.
CPC ..................................... *G06F 1/184* (2013.01)

(58) Field of Classification Search
CPC ........ G06F 1/1656; G06F 1/181; G06F 1/183; H05K 5/0239; H05K 5/03
See application file for complete search history.

(56) References Cited

U.S. PATENT DOCUMENTS

| | | | | |
|---|---|---|---|---|
| 5,199,888 A * | 4/1993 | Condra | ................ | G06F 1/1616 312/292 |
| 5,347,430 A * | 9/1994 | Curlee | ................... | G06F 1/184 174/363 |
| 5,379,183 A * | 1/1995 | Okonsky | ............... | G06F 1/1616 16/342 |
| 5,564,930 A * | 10/1996 | Yu | ........................... | G06F 1/181 361/679.41 |
| 5,574,625 A * | 11/1996 | Ohgami | ................ | G06F 1/1626 312/223.2 |
| 5,646,820 A * | 7/1997 | Honda | .................. | G06F 1/1616 361/679.6 |
| 5,738,536 A * | 4/1998 | Ohgami | ................ | G06F 1/1616 361/679.4 |
| 5,785,533 A * | 7/1998 | Baitz | ....................... | G06F 1/181 361/679.4 |
| 5,822,182 A * | 10/1998 | Scholder | ................. | G06F 1/183 361/679.57 |
| 5,997,115 A * | 12/1999 | Radloff | ................... | E05C 19/06 292/19 |
| 6,252,160 B1 * | 6/2001 | Chang | .................. | H05K 9/0016 174/377 |
| 6,297,948 B1 * | 10/2001 | Buican | .................... | G06F 1/181 206/320 |
| 6,307,756 B1 * | 10/2001 | Liu | .................... | H01R 13/6582 361/816 |

(Continued)

*Primary Examiner* — Adrian S Wilson
(74) *Attorney, Agent, or Firm* — Chun-Ming Shih; HDLS IPR SERVICES

(57) ABSTRACT

A computer device includes a holding structure, a motherboard module and a cover plate. The holding structure includes a holder and a frame. The holder includes a supporting face and an end edge. The frame is connected to the supporting face and arranged adjacent to the end edge. The frame includes an opening and a top bar. The motherboard module, including I/O ports disposed in the opening, is installed on the supporting face. The cover plate covers the opening, a bottom portion of the cover plate is detachably connected to the end edge with a positioning structure, a top portion of the cover plate is detachably connected to the top bar with a fastening structure, the cover plate includes through slots, and the I/O ports are inserted through or disposed corresponding to the through slots respectively, so that the computer device facilitates easy and flexible assembly.

8 Claims, 10 Drawing Sheets

(56) References Cited

U.S. PATENT DOCUMENTS

| | | | | |
|---|---|---|---|---|
| 6,330,139 B1* | 12/2001 | Liao | G06F 1/181 | 174/365 |
| 6,420,009 B1* | 7/2002 | Cheng | H05K 9/0016 | 361/818 |
| 6,628,512 B2* | 9/2003 | Searby | G06F 1/181 | 361/679.58 |
| 6,654,256 B2* | 11/2003 | Gough | G06F 1/182 | 174/383 |
| 6,816,370 B2* | 11/2004 | Searby | H05K 5/0208 | 361/679.33 |
| 7,121,637 B2* | 10/2006 | Fang | G06F 1/1613 | 312/223.2 |
| 7,123,487 B2* | 10/2006 | Saito | G06K 7/0013 | 361/801 |
| 7,151,666 B2* | 12/2006 | Song | H05K 7/1487 | 361/692 |
| 7,411,784 B2* | 8/2008 | Coglitore | H05K 9/0018 | 361/679.41 |
| 7,443,688 B2* | 10/2008 | Chen | G06F 1/181 | 312/223.2 |
| 7,460,375 B2* | 12/2008 | Randall | H05K 7/1492 | 361/724 |
| 7,744,172 B2* | 6/2010 | Chen | G06F 1/183 | 312/223.2 |
| 8,432,689 B2* | 4/2013 | Coglitore | H05K 7/1488 | 248/201 |
| 9,128,675 B2* | 9/2015 | Iwamoto | G06F 1/1656 | |
| 2003/0006680 A1* | 1/2003 | Dean | G06F 1/182 | 312/223.2 |
| 2007/0019389 A1* | 1/2007 | Du | G06F 1/1616 | 361/728 |
| 2008/0144276 A1* | 6/2008 | Yang | G06F 1/181 | 361/679.4 |
| 2009/0116187 A1* | 5/2009 | Yi | H05K 5/0213 | 361/692 |
| 2011/0122557 A1* | 5/2011 | Takeguchi | G06F 1/1615 | 361/679.01 |

* cited by examiner

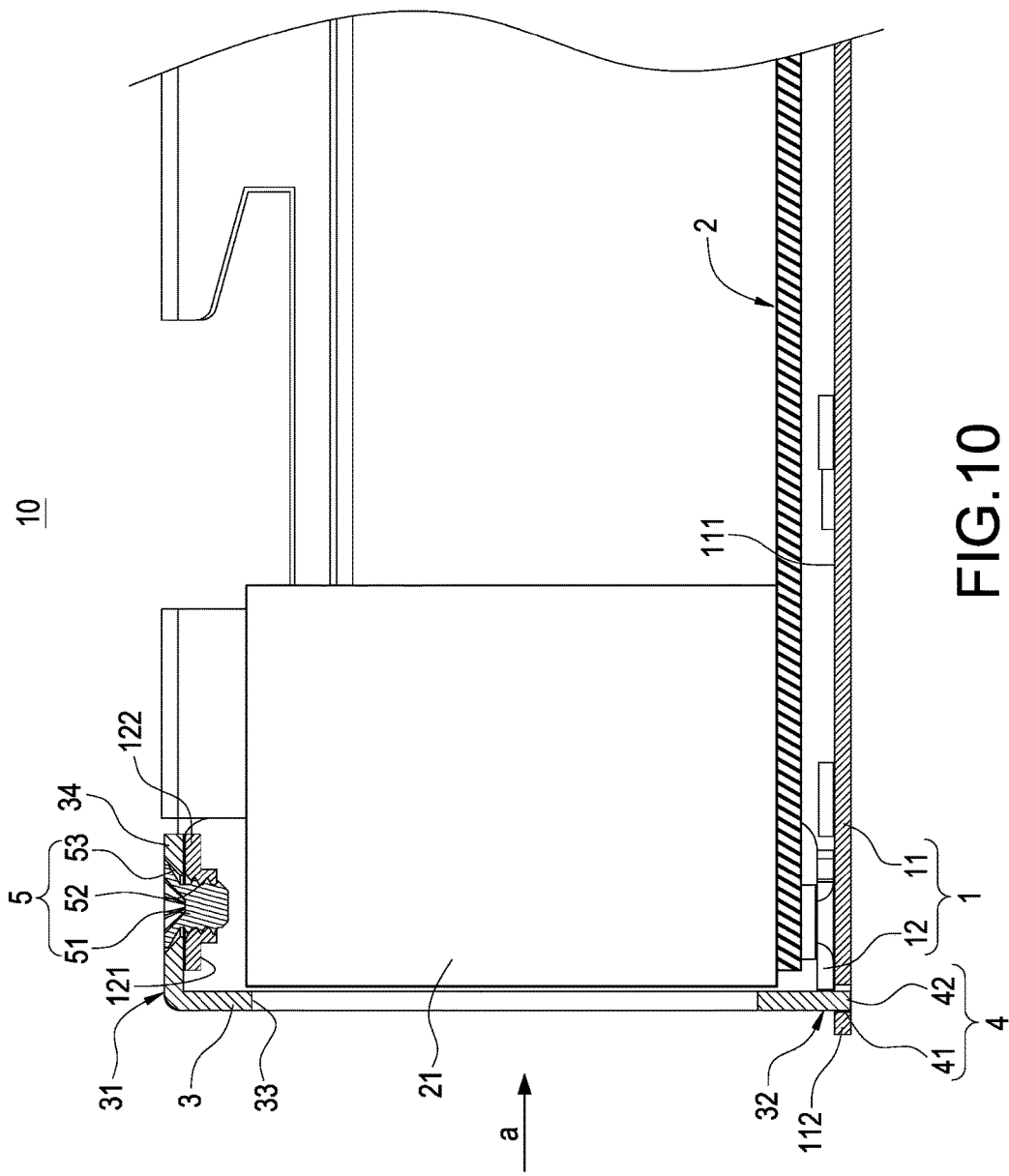

COMPUTER DEVICE

TECHNICAL FIELD

The present invention relates to a computer expansion structure and, in particular, to a computer device.

BACKGROUND

To give additional functionality to a computer, input/output (I/O) ports of a motherboard are used to communicate peripheral devices (e.g. a keyboard and a printer) with accessory cards (e.g. a graphics card, a data capture card, a redundant array of independent disks (RAID) card, a sound card, and a peripheral component interconnect express (PCIe) card) or a solid state disk.

A conventional computer device includes a motherboard module and a housing. The motherboard module includes a plurality of I/O ports, the housing includes a cover plate, and the cover plate is installed inside the housing and includes a plurality of insertion slots for insertion of the I/O ports. The motherboard module is finally assembled inside the housing, and the I/O ports are arranged corresponding to the insertion slots of the cover plate, respectively, to complete assembly of the computer device.

However, there is a problem with assembly of the computer device. Since the cover plate is installed in the housing before the motherboard module is assembled, it is important to know the motherboard's model number in advance in order to choose the matched cover plate. As a result, users have to decide the model number of the motherboard very early or have to put off assembling the cover plate, which makes assembly of the computer device quite troublesome.

In views of this, in order to solve the above disadvantages, the present inventor studied related technology and provided a reasonable and effective solution in the present disclosure.

SUMMARY

The present invention provides a computer device, and its cover plate is assembled outside the frame. No matter whether the motherboard module has been assembled to a holder or not, the cover plate can be assembled to or detached from the frame according to requirement. Thus, the computer device facilitates easy and flexible assembly.

According to one embodiment of the present invention, a computer device is provided, comprising a holding structure, a motherboard module and a cover plate. The holding structure includes a holder and a frame, the holder includes a supporting face and an end edge at one side of the supporting face, the frame is connected to the supporting face and arranged adjacent to the end edge, the frame includes an opening and a top bar arranged above the opening, the opening defines an opening direction, and the opening direction is parallel to the supporting face. The motherboard module is installed on the supporting face and is arranged at one side of the frame away from the end edge, and the motherboard module includes a plurality of input/output (I/O) ports disposed in the opening. A bottom portion of the cover plate is detachably connected to the end edge with a positioning structure, a top portion of the cover plate is detachably connected to the top bar with a fastening structure, the cover plate includes a plurality of through slots, and the I/O ports are inserted through or disposed corresponding to the through slots respectively.

Accordingly, the bottom portion of the cover plate is detachably connected to the end edge by means of the positioning structure, and the top portion of the cover plate is detachably connected to the top bar by means of the fastening structure, so that the cover plate can be assembled outside the frame. The motherboard module assembled on the holder can be checked and tested first before the cover plate is assembled to the frame.

BRIEF DESCRIPTION OF THE DRAWINGS

The disclosure will become more fully understood from the detailed description, and the drawings given herein below is for illustration only, and thus does not limit the disclosure, wherein:

FIG. 10 is a cross-sectional view illustrating the computer device according to the fourth embodiment of the present invention.

DETAILED DESCRIPTION

Figure 1:
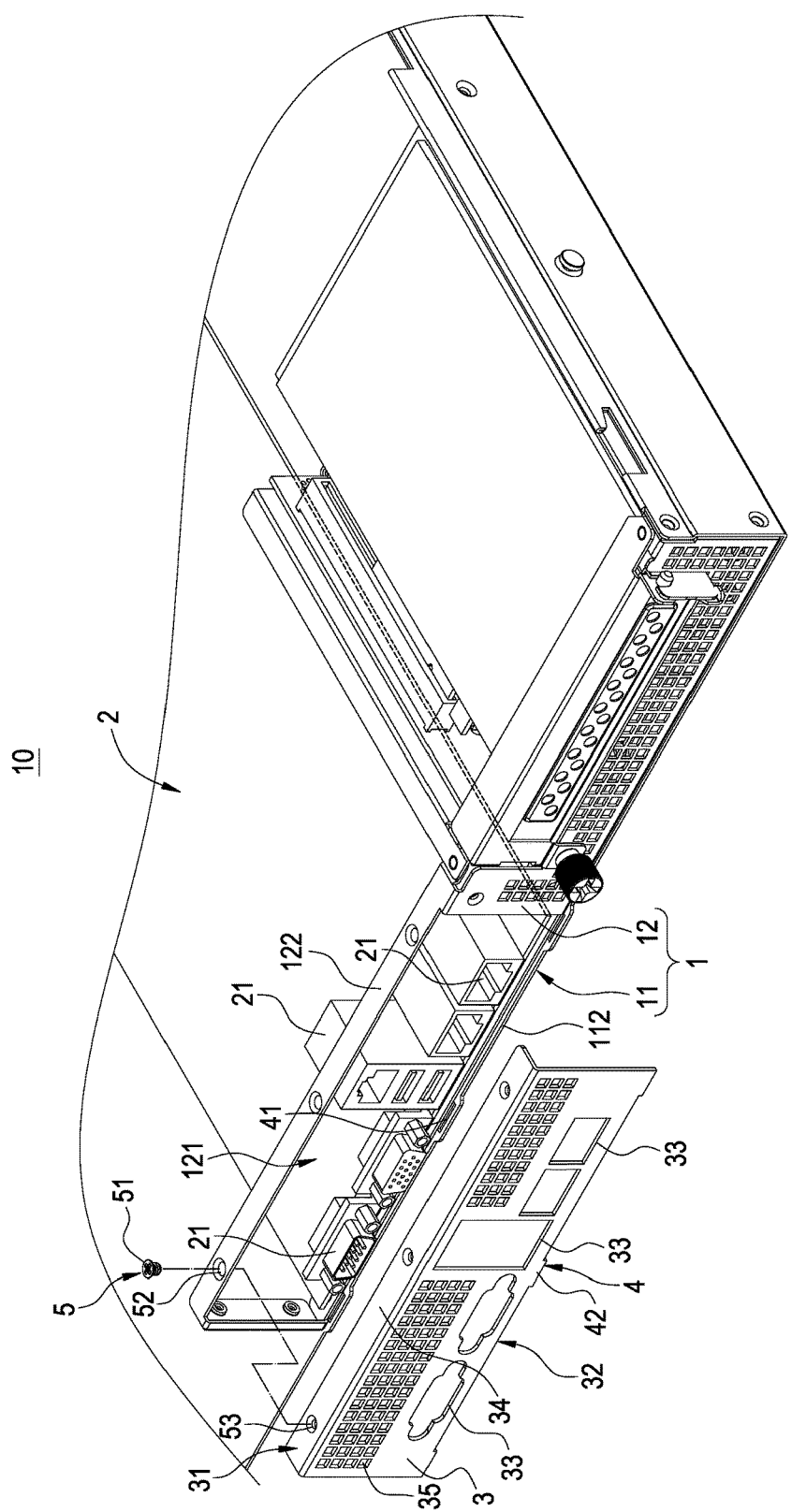
FIG. 1 is a perspective exploded view illustrating a computer device according to the first embodiment of the present invention.
Figure 2:
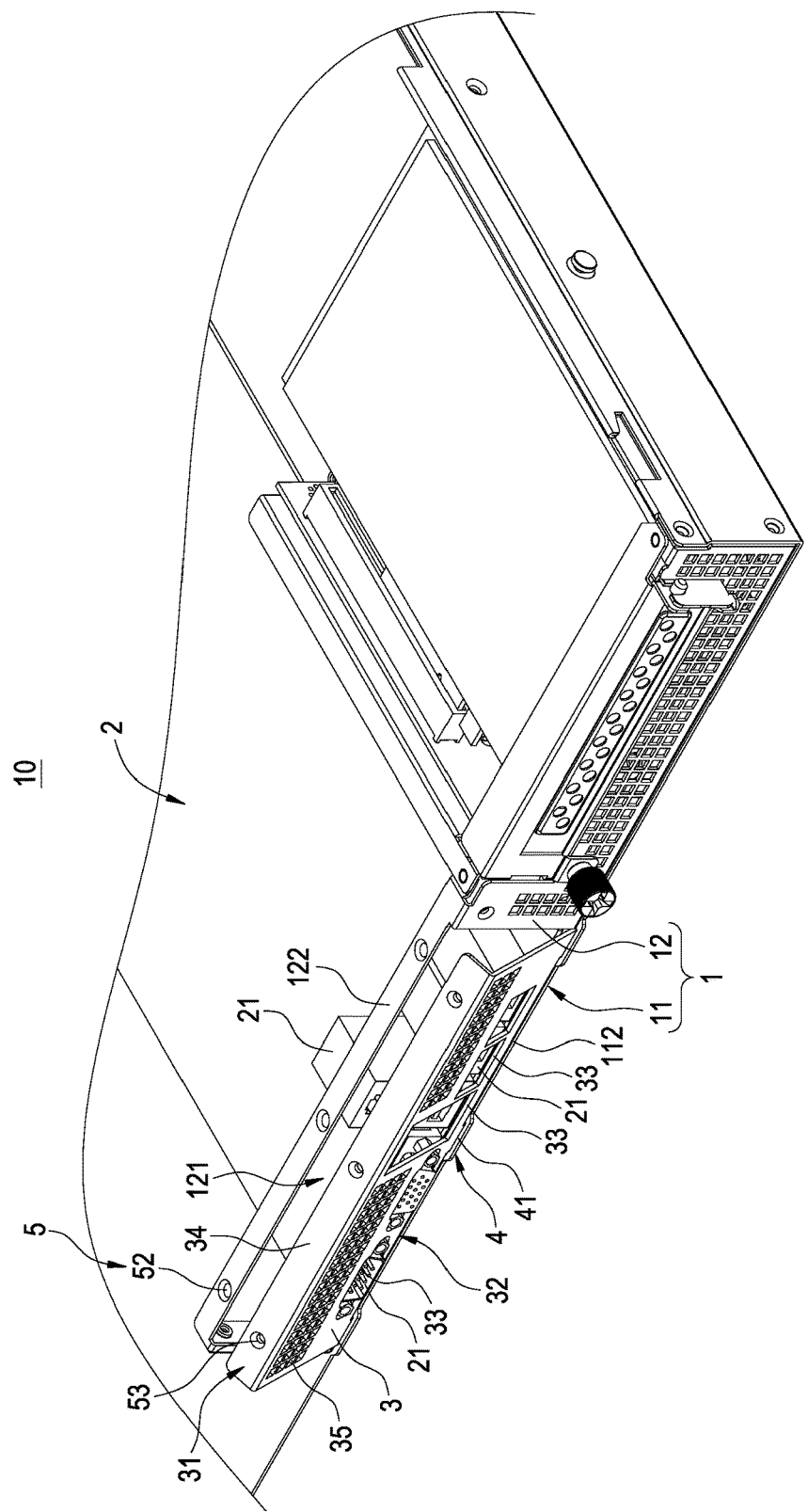
FIG. 2 is a perspective assembled view illustrating the computer device according to the first embodiment of the present invention.
Figure 3:
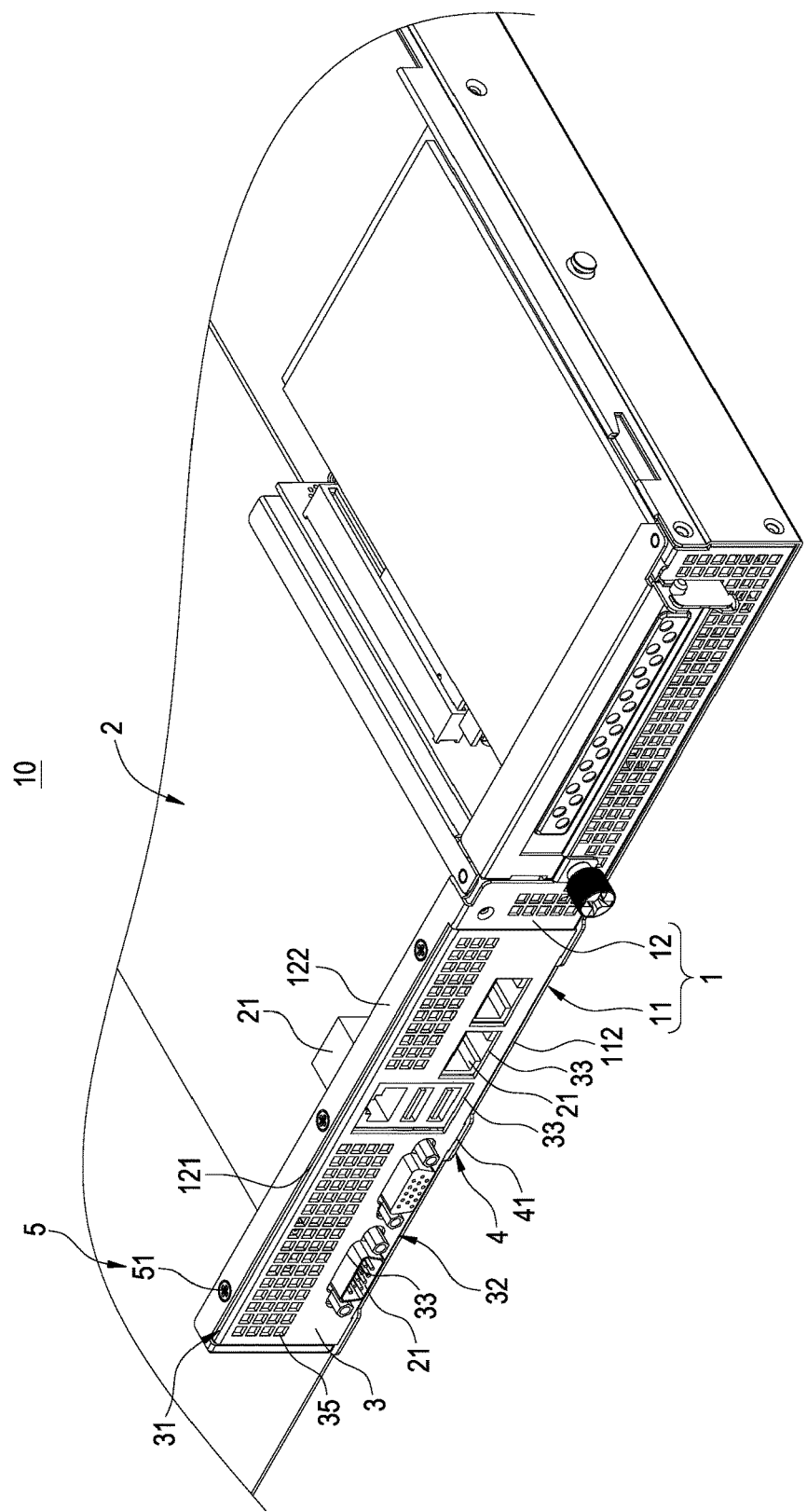
FIG. 3 is another perspective assembled view illustrating the computer device according to the first embodiment of the present invention.
Figure 4:
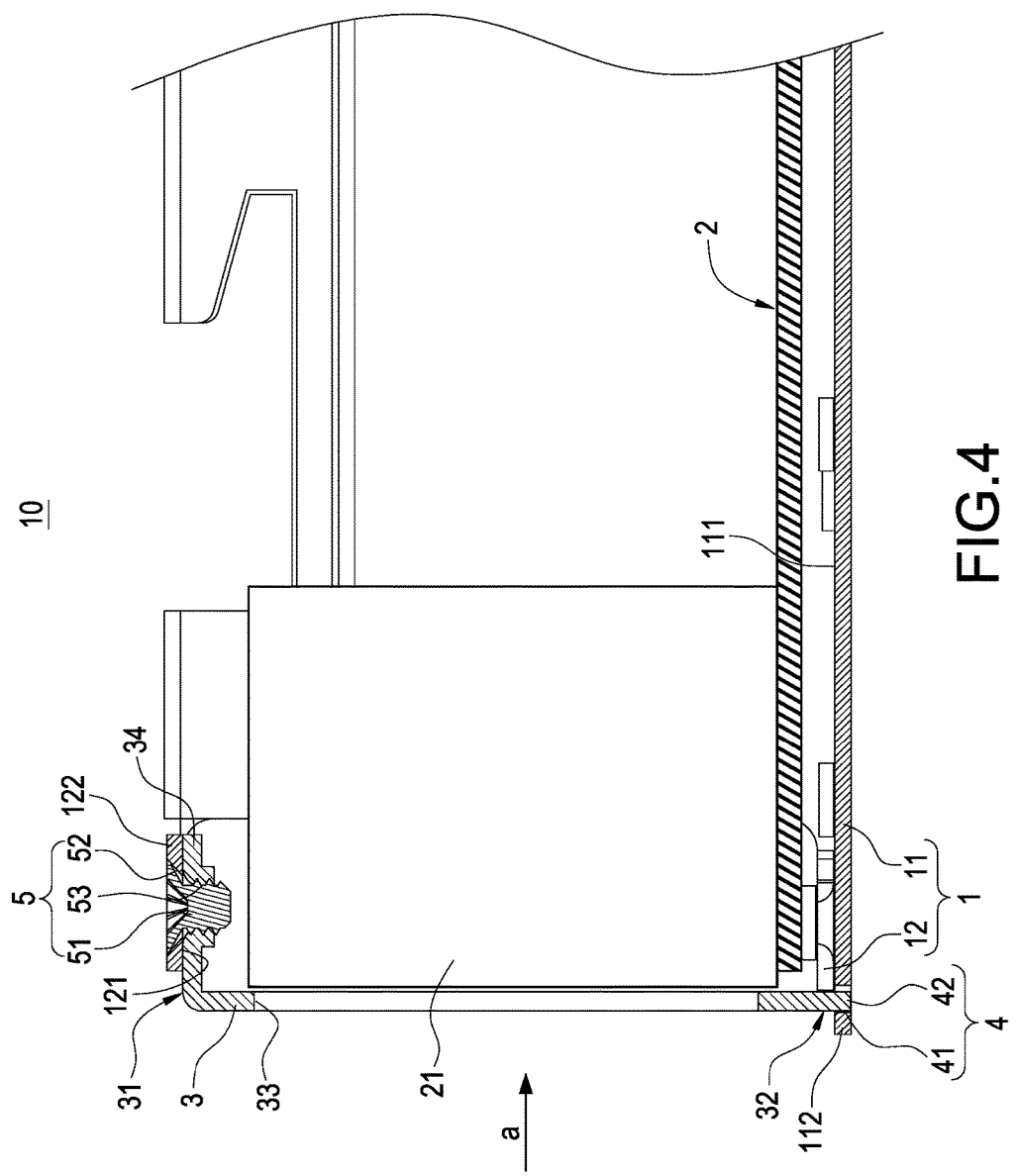
FIG. 4 is a cross-sectional view illustrating the computer device according to the first embodiment of the present invention.

Detailed descriptions and technical contents of the present invention are illustrated below in conjunction with the accompany drawings. However, it is to be understood that the descriptions and the accompany drawings disclosed herein are merely illustrative and exemplary and not intended to limit the scope of the present invention.

Please refer to FIGS. 1 to 4, illustrating a computer device according to the first embodiment of the present invention. The computer device 10 includes a holding structure 1, a motherboard module 2 and a cover plate 3.

The holding structure 1 includes a holder 11 and a frame 12, the holder 11 includes a supporting face 111 and an end edge 112 at one side of the supporting face 111, the frame 12 is connected to the supporting face 111 and is arranged adjacent to the end edge 112, the frame 12 includes an opening 121 and a top bar 122 arranged above the opening 121, the opening 121 defines an opening direction A, and the opening direction A is parallel to the supporting face 111. The holder 11 can be a plate or a box; however, the present invention is not limited in this regard.

The motherboard module 2 is installed on the supporting face 111 and is arranged at one side of the frame 12 away from the end edge 112. The motherboard module 2 includes a plurality of input/output (I/O) ports 21 disposed in the opening 121. The I/O ports 21 can be connectors of a solid state disk or an accessory card like a graphics card, a data capture card, a redundant array of independent disks (RAID) card, a sound card, and a peripheral component interconnect express (PCIe) card.

The cover plate 3 covers the opening 121. A bottom portion 3132 of the cover plate 3 is detachably connected to the end edge 112 by means of a positioning structure 4, a top portion 3231 of the cover plate 3 is detachably connected to the top bar 122 with a fastening structure 5, and the cover plate 3 includes a plurality of through slots 33. The I/O ports 21 are inserted through or disposed corresponding to the through slots 33 respectively. Therefore, peripheral devices like a keyboard and a printer can be connected to the I/O ports 21 via the through slots 33 to add functionality.

Moreover, a top portion 3231 of the cover plate 3 bends an extension board 34, and the extension board 34 is arranged under and in contact with the top bar 122. The extension board 34, the top bar 122 and the supporting face 111 are parallel to one another. A plurality of second fastening holes 53 are formed on the extension board 34. The cover plate 3 includes a plurality of through holes 35. The through holes 35 are configured to dissipate heat from the inside of the holding structure 1 and to improve ventilation.

The positioning structure 4 includes a plurality of engagement grooves 41 extending downwardly and a plurality of protruding plates 42 extending from the bottom portion 3132 of the cover plate 3, and the protruding plates 42 are engaged with the engagement grooves 41 respectively. This way, the bottom portion 3132 of the cover plate 3 is detachably assembled to the end edge 112.

The fastening structure 5 includes a plurality of insertion elements 51, a plurality of first fastening holes 52 formed on the top bar 122, and a plurality of second fastening holes 53 formed on the top portion 3231 of the cover plate 3. Each of the insertion elements 51 is fastened to a corresponding one of the first fastening holes 52 and a corresponding one of the second fastening holes 53. The top portion 3231 of the cover plate 3 is detachably assembled to the top bar 122. The insertion element 51 can be a screw, a pin or a fastener; however, the present invention is not limited in this regard.

In the computer device 10 of the present invention, a cover plate 3 covers the opening 21, the bottom portion 32 of the cover plate 3 is detachably assembled to the end edge 112 by means of the positioning structure 4, the top portion 31 of the cover plate 3 is detachably connected to the top bar 122 by means of the fastening structure 5, and thereby the cover plate 3 can be assembled outside the frame 12. No matter whether the motherboard module 2 is assembled to the holder 11 or not, the cover plate 3 can be assembled to or detached from the frame 12 according to requirement. Therefore, the motherboard module 2 installed on the holder 11 can be tested and checked first before the cover plate 3 is installed on the frame 12. Thus, the computer device 10 facilitates easy and flexible assembly.

Figure 5:
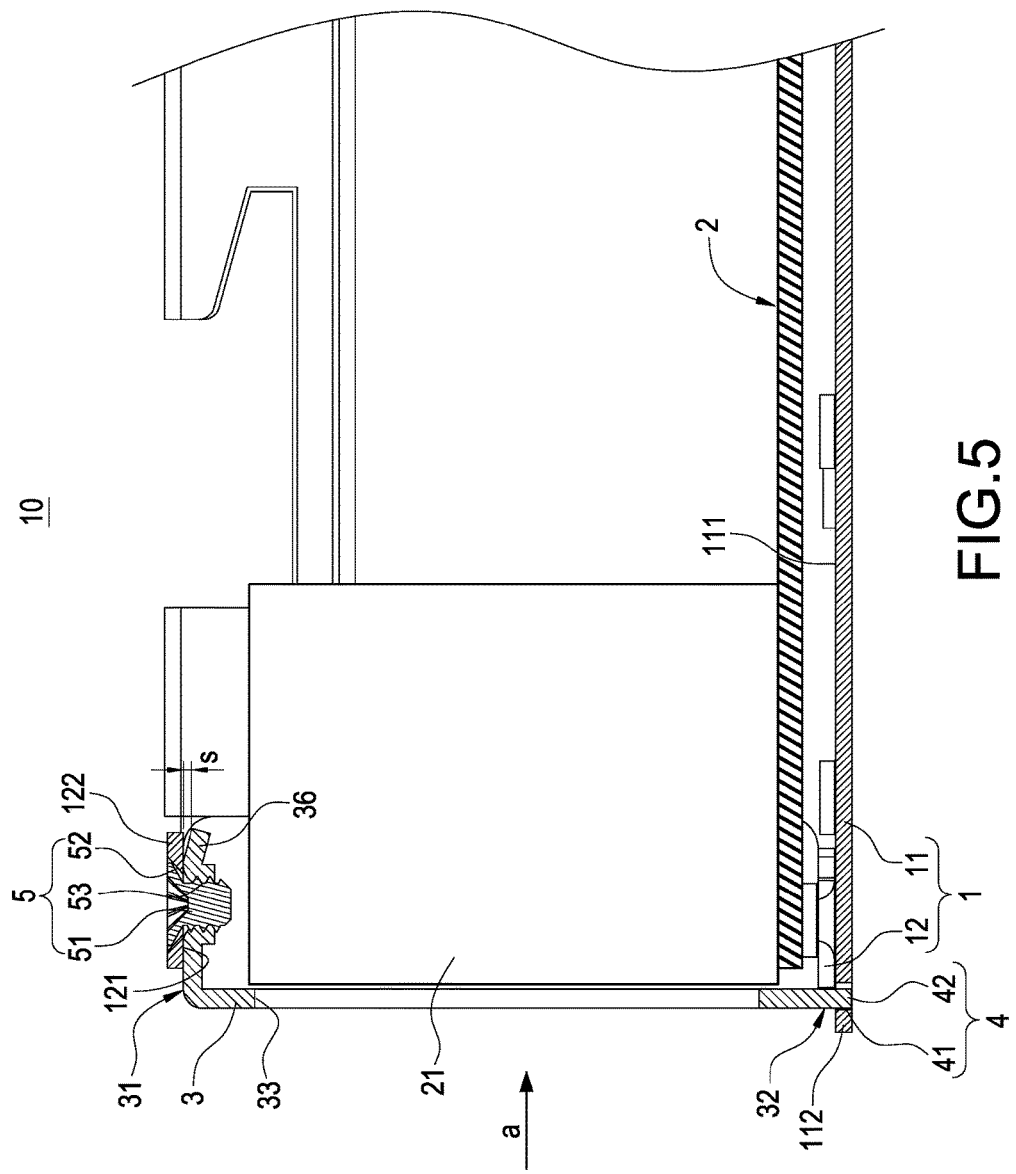
FIG. 5 is a cross-sectional view illustrating the computer device according to the second embodiment of the present invention.

Please refer to FIG. 5 showing the computer device 10 according to the second embodiment of the present invention. The second embodiment is similar to the first embodiment with the difference that, an inclined plate 36 is bent from the extension board 34.

In detail, from one end of the extension board 34 away from the cover plate 3, an inclined plate 36 is extended and bent toward the supporting face 111. There is a distance S between the inclined plate 36 and the top bar 122. Since the inclined plate 36 is bent toward the supporting face 111, the inclined plate 36 is prevented from colliding or interfering with the top bar 122, when the cover plate 3 covers the opening 121, and the extension board 34 is arranged under and in contact with the top bar 122. Consequently, it is very easy to place the extension board 34 under and in contact with the top bar 122, thus facilitating easy and convenient assembly of the computer device 10.

Figure 6:
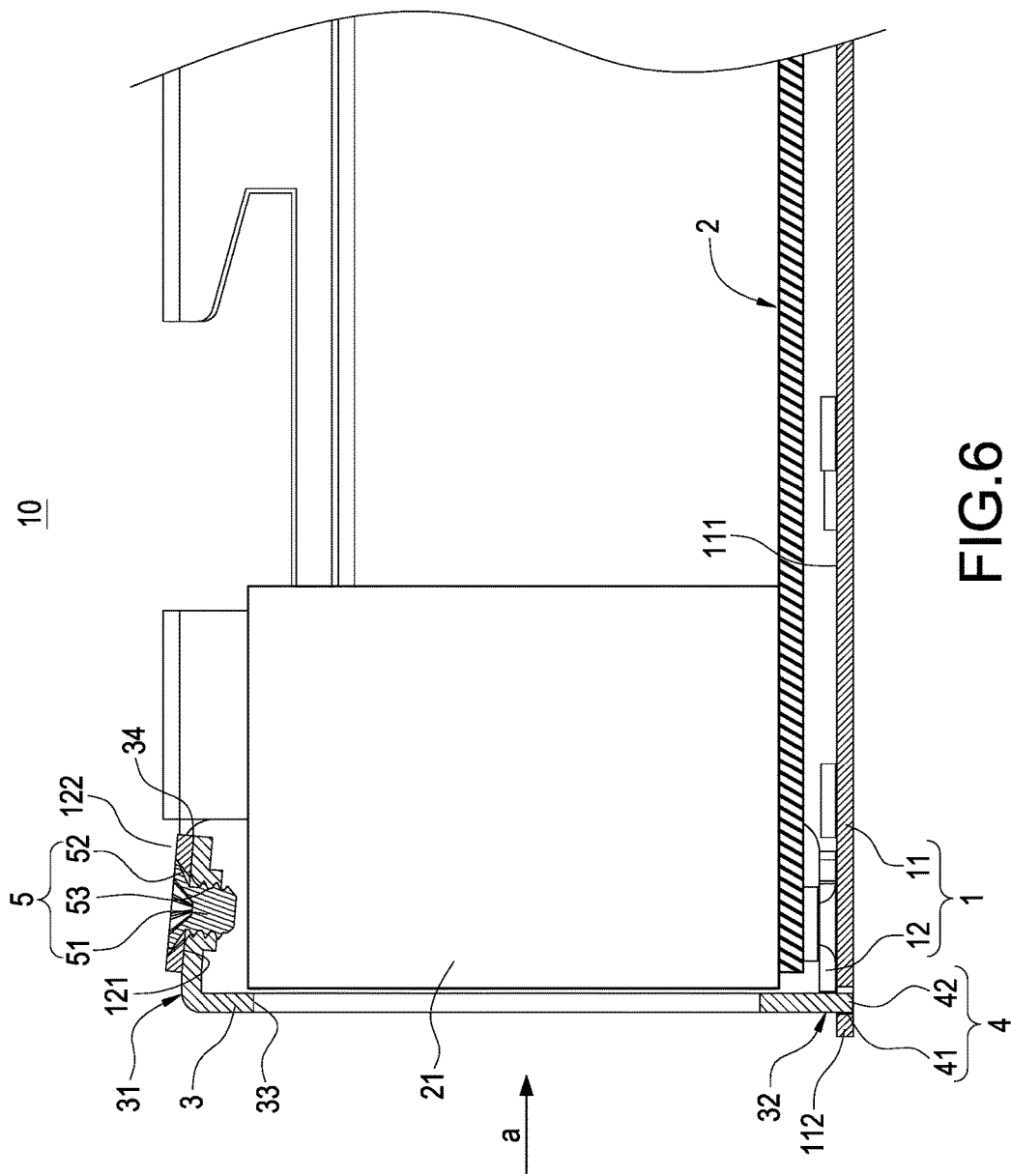
FIG. 6 is a cross-sectional view illustrating the computer device according to the third embodiment of the present invention.
Figure 7:
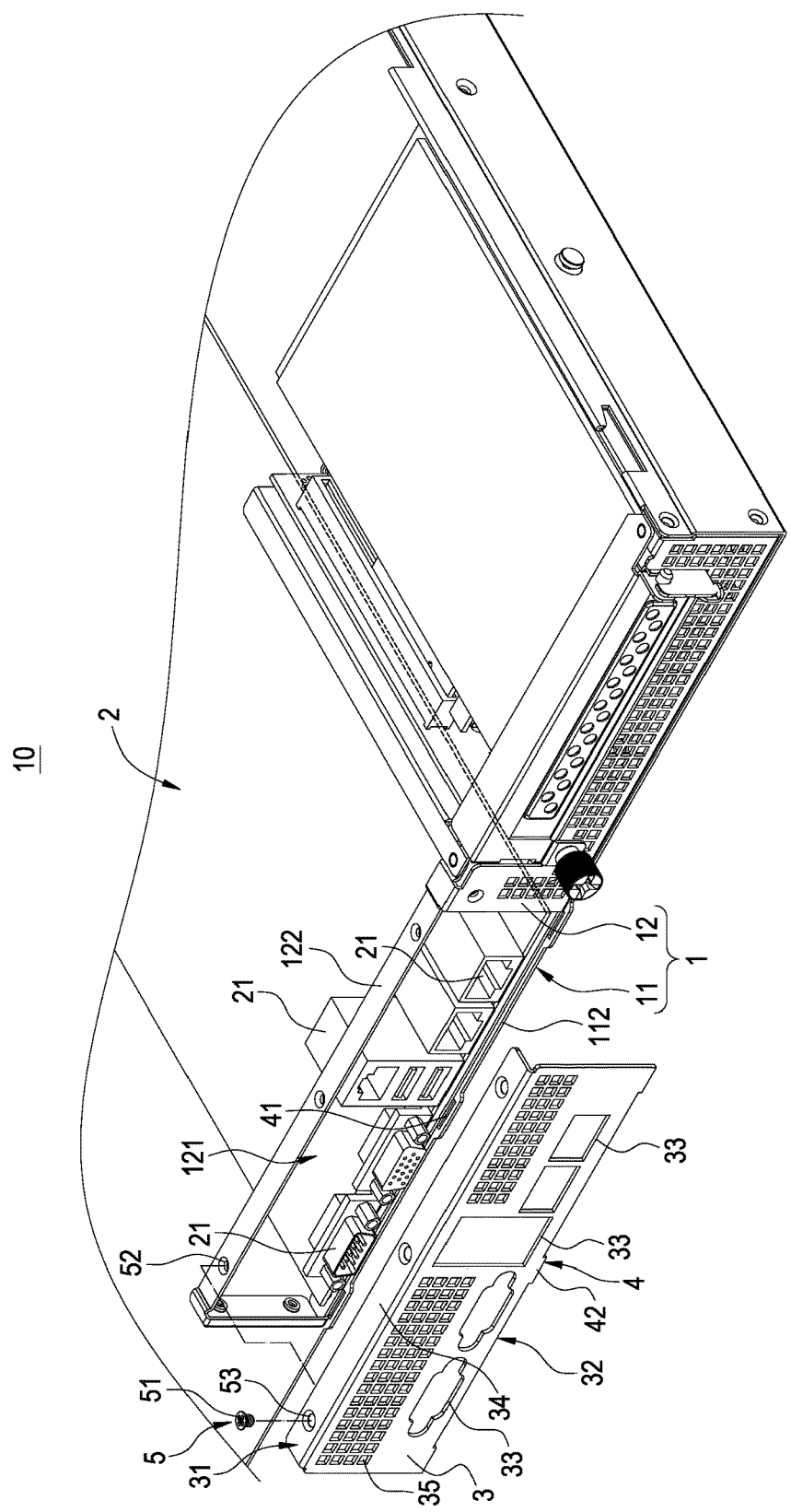
FIG. 7 is a perspective exploded view illustrating the computer device according to the fourth embodiment of the present invention.
Figure 8:
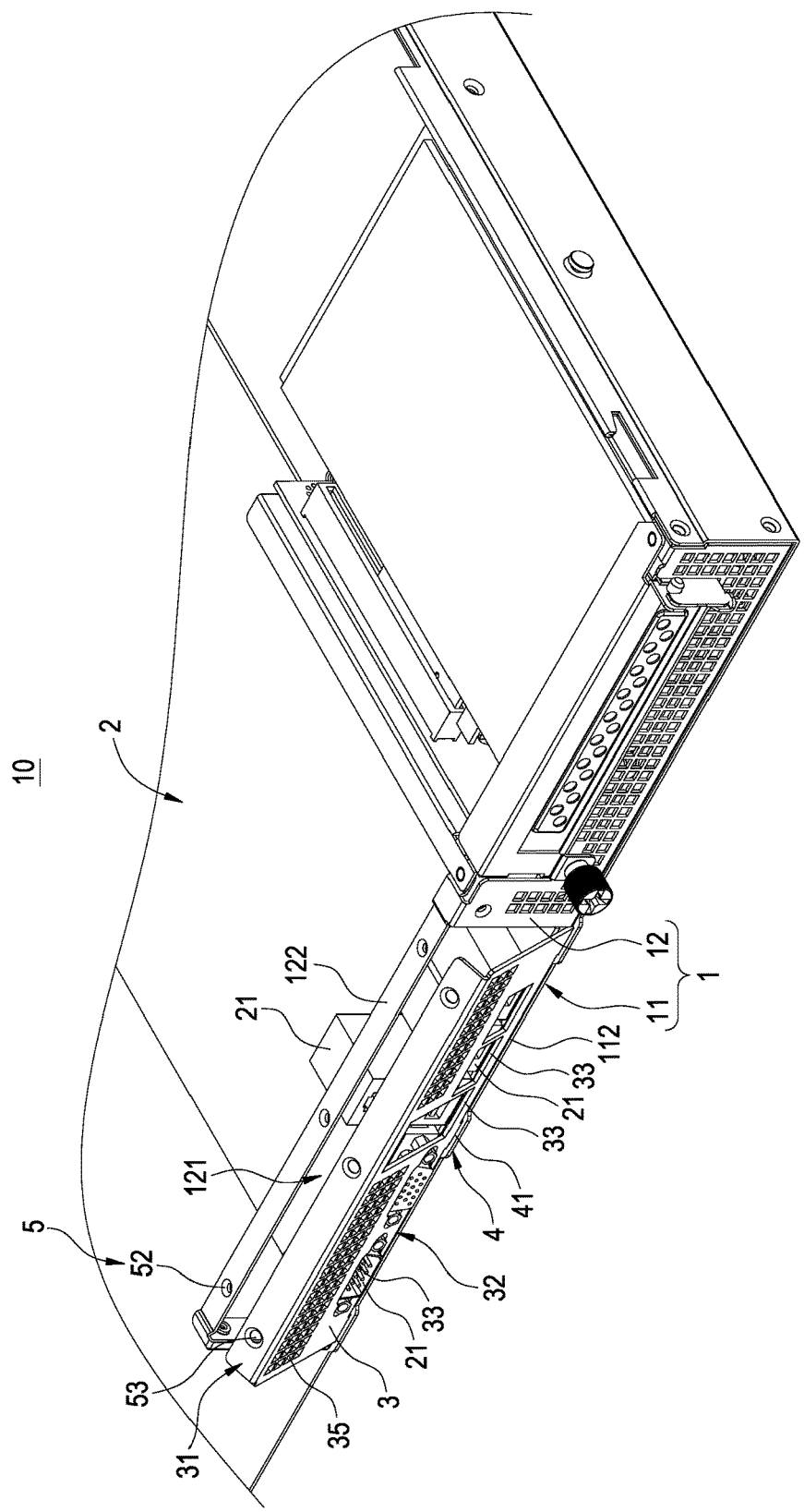
FIG. 8 is a perspective assembled view illustrating the computer device according to the fourth embodiment of the present invention.
Figure 9:
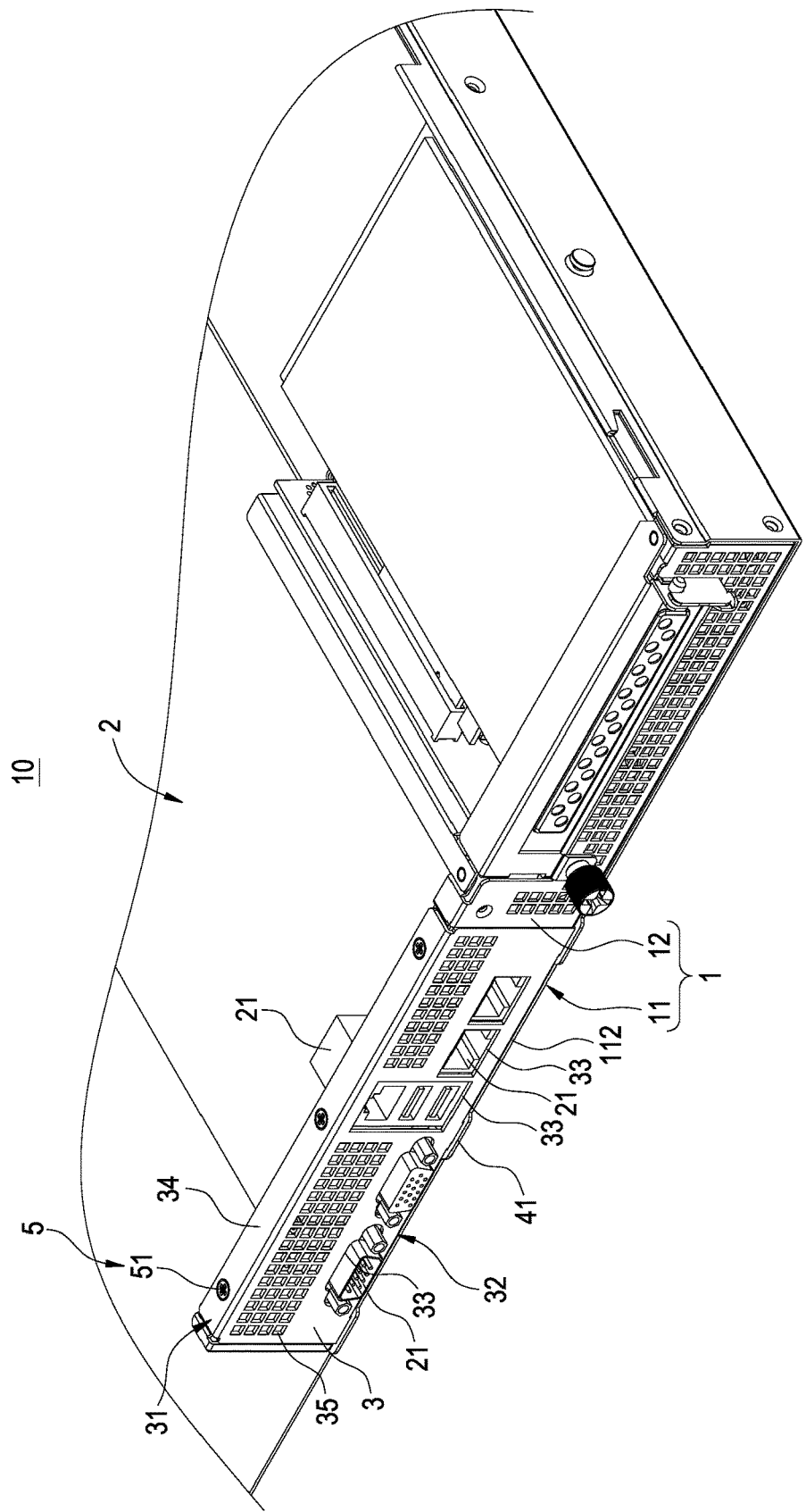
FIG. 9 is another perspective assembled view illustrating the computer device according to the fourth embodiment of the present invention.

Please refer to FIG. 6 showing the computer device 10 according to the third embodiment of the present invention. The third embodiment is similar to the first embodiment with the difference that the extension board 34 and the top bar 122 are both inclined toward the supporting face 111.

Moreover, because the extension board 34 and the top bar 122 are both bent toward the supporting face 111, the extension board 34 is prevented from colliding or interfering with the top bar 122, when the cover plate 3 covers the opening 121, and the extension board 34 is arranged under and in contact with the top bar 122. Consequently, it is very easy to place the extension board 34 under and in contact with the top bar 122, thus facilitating easy and convenient assembly of the computer device 10.

Please refer to FIGS. 7 to 10 illustrating the computer device 10 according to the fourth embodiment of the present invention. The fourth embodiment is similar to the first embodiment with the difference that the extension board 34 is arranged on and in contact with the top bar 122. Because the same function can be achieved no matter the extension board 34 in contact with the top bar 122 is arranged on or under the top bar 122, the fourth embodiment achieves the same functions as the first embodiment does.

In summary, the computer device of the present invention can achieve anticipated objectives and solve the conventional defects. The present invention also has industrial applicability, novelty and non-obviousness, so the present invention completely complies with the requirements of patentability. Therefore, a request to patent the present invention is filed pursuant to patent law. Examination is kindly requested, and allowance of the present application is solicited to protect the rights of the inventor.

What is claimed is:

1. A computer device, comprising:
    a holding structure including a holder and a frame, the holder including a supporting face and an end edge at one side of the supporting face, the frame being connected to the supporting face and arranged adjacent to the end edge, the frame including an opening and a top bar arranged above the opening, the opening defining an opening direction, the opening direction being parallel to the supporting face;
    a motherboard module, the motherboard module being installed on the supporting face and being arranged at one side of the frame away from the end edge, the motherboard module including a plurality of input/output ports disposed in the opening; and
    a cover plate covering the opening, a bottom portion of the cover plate being detachably connected to the end edge with a positioning structure, a top portion of the cover plate being detachably connected to the top bar with a fastening structure, the cover plate including a plurality of through slots, the input/output ports being inserted through or disposed corresponding to the through slots respectively,
    wherein the positioning structure includes a plurality of engagement grooves extending downwardly and a plurality of protruding plates extending from the bottom portion of the cover plate, and the protruding plates are engaged with the engagement grooves respectively;

wherein the fastening structure includes a plurality of insertion elements, a plurality of first fastening holes formed on the top bar, and a plurality of second fastening holes formed on the top portion of the cover plate, and each of the insertion elements is fastened to a corresponding one of the first fastening holes and a corresponding one of the second fastening holes.

2. The computer device according to claim 1, wherein the top portion of the cover plate bends to form an extension board, and the second fastening holes are formed on the extension board.

3. The computer device according to claim 2, wherein the extension board is arranged under and in contact with the top bar.

4. The computer device according to claim 3, wherein from one end of the extension board away from the cover plate, an inclined plate is extended and bent toward the supporting face.

5. The computer device according to claim 2, wherein the extension board is arranged on and in contact with the top bar.

6. The computer device according to claim 3, wherein the extension board, the top bar and the supporting face are parallel to one another.

7. The computer device according to claim 3, wherein the extension board and the top bar are both inclined toward the supporting face.

8. The computer device according to claim 3, wherein the cover plate includes a plurality of through holes.

\* \* \* \* \*